(12) United States Patent
Rittenhouse

(10) Patent No.: US 9,371,676 B2
(45) Date of Patent: Jun. 21, 2016

(54) 360 DEGREE HINGE ASSEMBLY FOR ELECTRONIC DEVICES

(71) Applicant: Intel Corporation, Santa Clara, CA (US)

(72) Inventor: David A. Rittenhouse, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,040

(22) Filed: Sep. 26, 2014

(65) Prior Publication Data
US 2016/0090766 A1    Mar. 31, 2016

(51) Int. Cl.
*E05D 3/06* (2006.01)
*E05D 11/08* (2006.01)
*E05D 3/12* (2006.01)

(52) U.S. Cl.
CPC . *E05D 11/08* (2013.01); *E05D 3/12* (2013.01)

(58) Field of Classification Search
CPC .............. Y10T 16/547; Y10T 16/5475; Y10T 16/5403; Y10T 16/54038; Y10T 16/5325; Y10T 16/53864; Y10T 16/540345; Y10T 16/5474; G06F 1/1681; G06F 1/1616; G06F 1/1618; H05K 5/0226; H04M 1/0214; H04M 1/0216; H04M 1/022; E05Y 2900/606; E05D 3/12; E05D 3/06; E05D 11/06
See application file for complete search history.

(56) References Cited

U.S. PATENT DOCUMENTS

| | | | | |
|---|---|---|---|---|
| 5,600,868 A * | 2/1997 | Tourville | .............. | E05F 1/1223 16/277 |
| 6,154,359 A * | 11/2000 | Kamikakai | ........... | G06F 1/1618 16/342 |
| 6,185,102 B1 * | 2/2001 | Shou | ........................ | G06F 1/203 16/223 |
| 2002/0038493 A1* | 4/2002 | Ko | ........................ | H04N 5/2251 16/303 |
| 2003/0172497 A1* | 9/2003 | Cha | ........................ | E05D 11/082 16/342 |
| 2004/0134033 A1* | 7/2004 | Raines | ............... | G02B 27/0149 16/342 |
| 2005/0172454 A1* | 8/2005 | Chen | ...................... | G06F 1/1616 16/330 |
| 2006/0238968 A1* | 10/2006 | Maatta | ................ | H04M 1/0218 361/679.01 |
| 2007/0204433 A1* | 9/2007 | Chang | ................... | G06F 1/1679 16/340 |
| 2008/0184527 A1* | 8/2008 | Chao | ...................... | G06F 1/1616 16/221 |
| 2009/0183339 A1* | 7/2009 | Duan | .................. | H04M 1/0216 16/277 |
| 2010/0251518 A1* | 10/2010 | Chiang | ................. | G06F 1/1681 16/277 |
| 2011/0154614 A1* | 6/2011 | Chien | .................. | E05D 11/1014 16/297 |
| 2013/0170108 A1* | 7/2013 | Lin | ........................ | G06F 1/1618 361/679.01 |
| 2013/0175914 A1* | 7/2013 | Lin | ........................ | G06F 1/1681 312/327 |
| 2013/0318746 A1* | 12/2013 | Kuramochi | ........... | G06F 1/1681 16/342 |
| 2014/0251044 A1* | 9/2014 | Hsu | ........................ | G06F 1/1681 74/96 |
| 2014/0376180 A1* | 12/2014 | Chen | ...................... | G06F 1/1681 361/679.55 |
| 2015/0047152 A1* | 2/2015 | Cheng | ..................... | E05D 3/122 16/354 |
| 2015/0047446 A1* | 2/2015 | Lai | ........................... | E05D 3/12 74/96 |
| 2015/0189777 A1* | 7/2015 | Hsu | ...................... | H05K 5/0226 16/366 |
| 2015/0245510 A1* | 8/2015 | Hsu | ...................... | H05K 5/0226 16/250 |

* cited by examiner

Primary Examiner — Chuck Mah
(74) Attorney, Agent, or Firm — Alpine Technology Law Group LLC

(57) ABSTRACT

In one example a hinge assembly for an electronic device comprises a linkage comprising a first bushing disposed at a first end of the linkage and a second bushing disposed at a second end of the bushing, a first shaft rotatable within the first bushing about a first axis, a second shaft rotatable within the second bushing about a second axis, and at least one compression element disposed on the first shaft, wherein the first shaft and the first bushing are threaded such that rotation of the first shaft within the first bushing induces lateral translation of the first shaft along the first axis. Other examples may be described.

21 Claims, 10 Drawing Sheets

360 DEGREE HINGE ASSEMBLY FOR ELECTRONIC DEVICES

RELATED APPLICATIONS

None.

BACKGROUND

The subject matter described herein relates generally to the field of electronic devices and more particularly to a 360 degree hinge assembly in electronic devices.

Electronic devices such as laptop computers, notebook computers, and the like comprise displays which are commonly coupled to a base section by a hinge assembly. Most existing hinge assemblies provide a constant torque required to open and close the hinge. Accordingly additional hinge configurations may find utility.

BRIEF DESCRIPTION OF THE DRAWINGS

The detailed description is described with reference to the accompanying figures.

DETAILED DESCRIPTION

Described herein are exemplary systems and methods to implement a 360 degree hinge assembly in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide electronic device displays with a 360 degree hinge assembly. The subject matter described herein addresses these and other issues by providing a hinge assembly for an electronic device which incorporates a linkage comprising a first bushing disposed at a first end of the linkage and a second bushing disposed at a second end of the bushing, a first shaft rotatable within the first bushing about a first axis, a second shaft rotatable within the second bushing about a second axis, and at least one compression element disposed on the first shaft, wherein the first shaft and the first bushing are threaded such that rotation of the first shaft within the first bushing induces lateral translation of the first shaft along the first axis.

Further structural and operational details will be described with reference to FIGS. 1-10, below.

Figure 1:
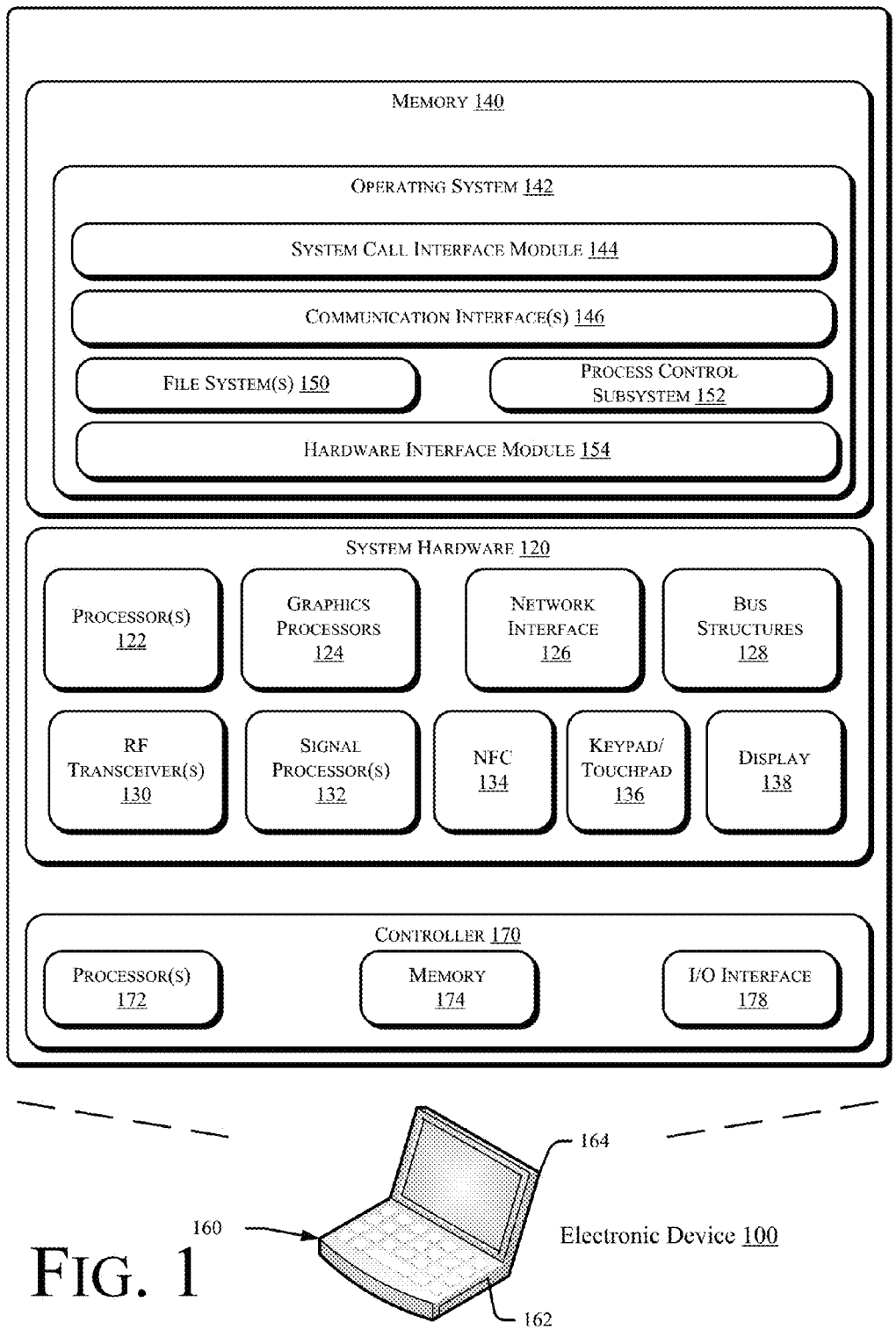
FIG. 1 is a schematic illustration of an electronic device which may be adapted to implement a 360 degree hinge assembly in accordance with some examples.

FIG. 1 is a schematic illustration of an electronic device 100 which may be adapted to implement a 360 degree hinge assembly in accordance with some examples. In some examples electronic device 100 may include a chassis 160 having a first section 162 and a second section 164 rotatably coupled to the first section 162. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one example, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one example, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one example, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one example, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms In the example depicted in FIG. 1 the controller 170 comprises a processor 172, a memory module 174, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122.

Figure 2:
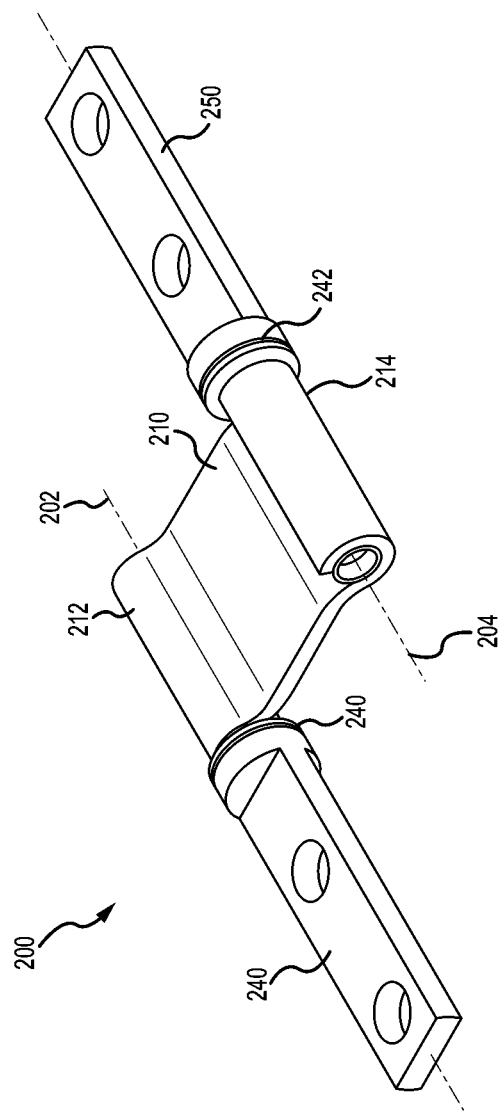
FIGS. 2-3 are schematic cross-sectional illustrations of components of a 360 degree hinge assembly in accordance with a first example.
Figure 3:
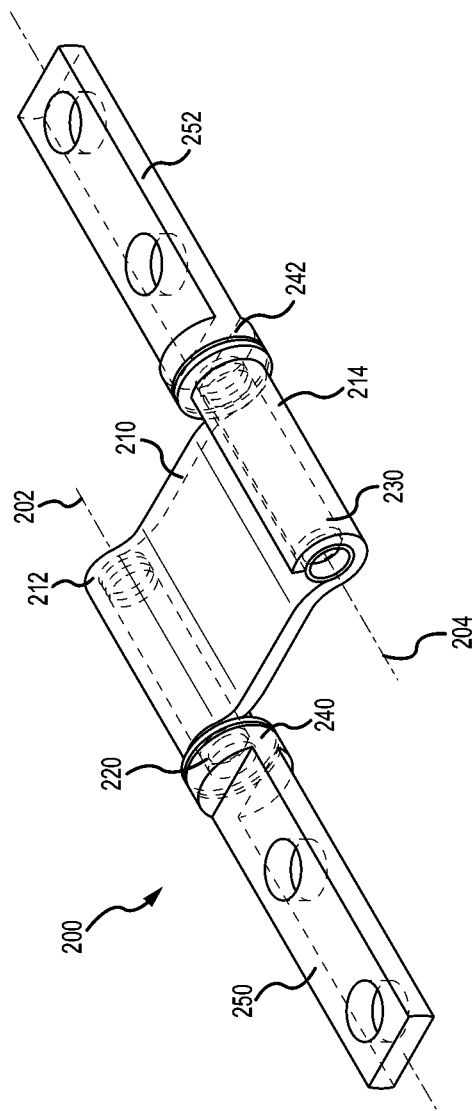

FIGS. 2-3 are schematic cross-sectional illustrations of components of a 360 degree hinge assembly in accordance with a first example Referring to FIGS. 2-3, in one example a hinge assembly 200 for an electronic device 100 comprises a linkage 210 comprising a first bushing 212 disposed at a first end of the linkage 210 and a second bushing 214 disposed at a second end of the linkage 210. A first shaft 220 is rotatable within the first bushing 212 about a first axis 202, and a second shaft 230 rotatable within the second bushing 214 about a second axis 204. At least one compression element disposed on the first shaft 220. The first shaft 220 and the first bushing 212 are threaded such that rotation of the first shaft 220 within the first bushing 212 induces lateral translation of the first shaft 220 along the first axis 202.

Linkage 210 may be formed from any suitable material, e.g., a metal or suitably rigid plastic material. In some examples the linkage 210 measures between about 0.40 inches and 0.70 inches in length and between about 0.75 inches and 1.0 inches in width, although the specific dimensions of linkage 210 are not critical. The bushings 212, 214 may integrally formed in linkage, e.g., by bending the ends of linkage 210 to define a bushing having a radius of curvature.

The first shaft 220 and the second shaft 230 may be formed from any suitable material, e.g., a metal or suitably rigid plastic material and may be formed with a radius that fits within the radius of curvature defined by bushings 212, 214. First shaft 220 may be coupled to a bracket 250 which, in turn, may be coupled to a first section of a housing for an electronic device. Similarly, second shaft 230 may be coupled to a bracket 252 which, in turn, may be coupled to a second section of a housing for an electronic device.

As described above, in some examples the first shaft 220 and the first bushing 212 are threaded such that rotation of the first shaft 220 within the first bushing 212 induces lateral translation of the first shaft 220 along the first axis 202. At least one compression element 240 is disposed on the first shaft 220 such that lateral translation of the first shaft 220 within the first bushing 212 changes a force applied to the at least one compression element 240 disposed on the first shaft 220, thereby changing a rotational resistance of the hinge assembly 200. In some embodiments the compression element 240 comprises at least one of a compression spring or a spring washer.

Similarly, in some examples the second shaft 230 and the second bushing 214 are threaded such that rotation of the second shaft 230 within the second bushing 214 induces lateral translation of the second shaft 230 along the second axis 204. At least one compression element 242 is disposed on the second shaft 230 such that lateral translation of the second shaft 230 within the second bushing 214 changes a force applied to the at least one compression element 242 disposed on the second shaft 230, thereby changing a rotational resistance of the hinge assembly 200. In some embodiments the compression element 240 comprises at least one of a compression spring or a spring washer.

Figure 4:
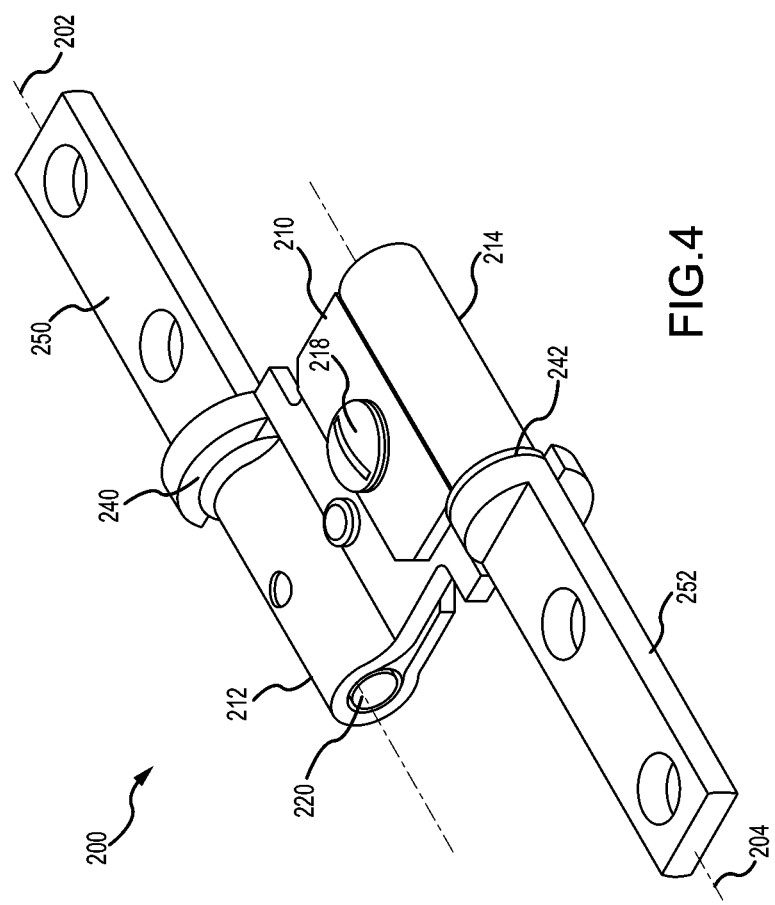
FIGS. 4-5 are schematic cross-sectional illustrations of components of a 360 degree hinge assembly in accordance with a second example.
Figure 5:
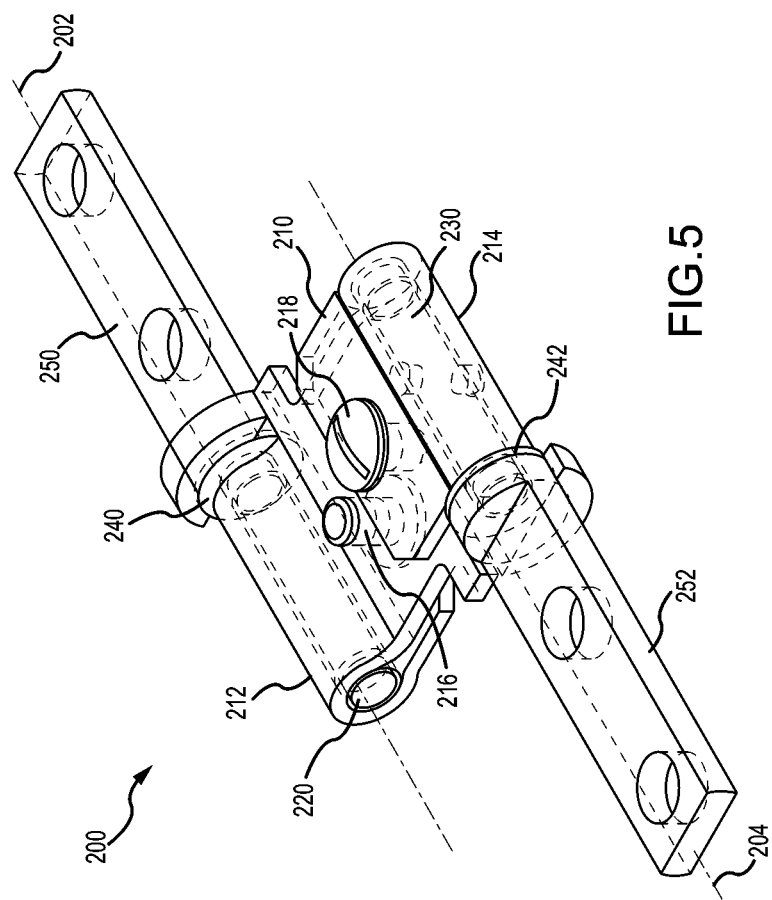

FIGS. 4-5 are schematic cross-sectional illustrations of components of a 360 degree hinge assembly in accordance with a second example. The basic components of the hinge assembly 200 depicted in FIGS. 4-5 are the same as the components depicted in FIGS. 2-3 and in the interest of clarity the descriptions will not be repeated. In the embodiment depicted in FIGS. 4-5 the linkage 210 includes a first tension screw 216 to adjust a tension between the first shaft 220 and the first bushing 212 and a second tension screw 218 to adjust a tension between the second shaft 230 and the second bushing 214. The tension screws 216, 218 may be used to set a base level of tension between the shafts 220, 230 and the respective bushings 212, 214. Rotation of the shafts 220, 230 within the respective bushings 212, 214 in a direction which compresses the compression element 240 then increases the rotational resistance of the hinge assembly 200 from the base level of tension set by the tension screws 216, 218.

The hinge assembly 200 may be mounted on a chassis 160 of an electronic device 100 to couple a first section 162 of the electronic device to a second section 164 of the electronic device 100, thereby providing a 360 degree hinge assembly for an electronic device 100. Shafts 220, 230 may be rotated through a full 360 degrees within the respective bushings 212, 214. Thus, the hinge assembly 200 allows for full 360 degree rotation of the first section 162 of the electronic device 100 with respect to the second section 164 of the electronic device 100.

Figure 6:
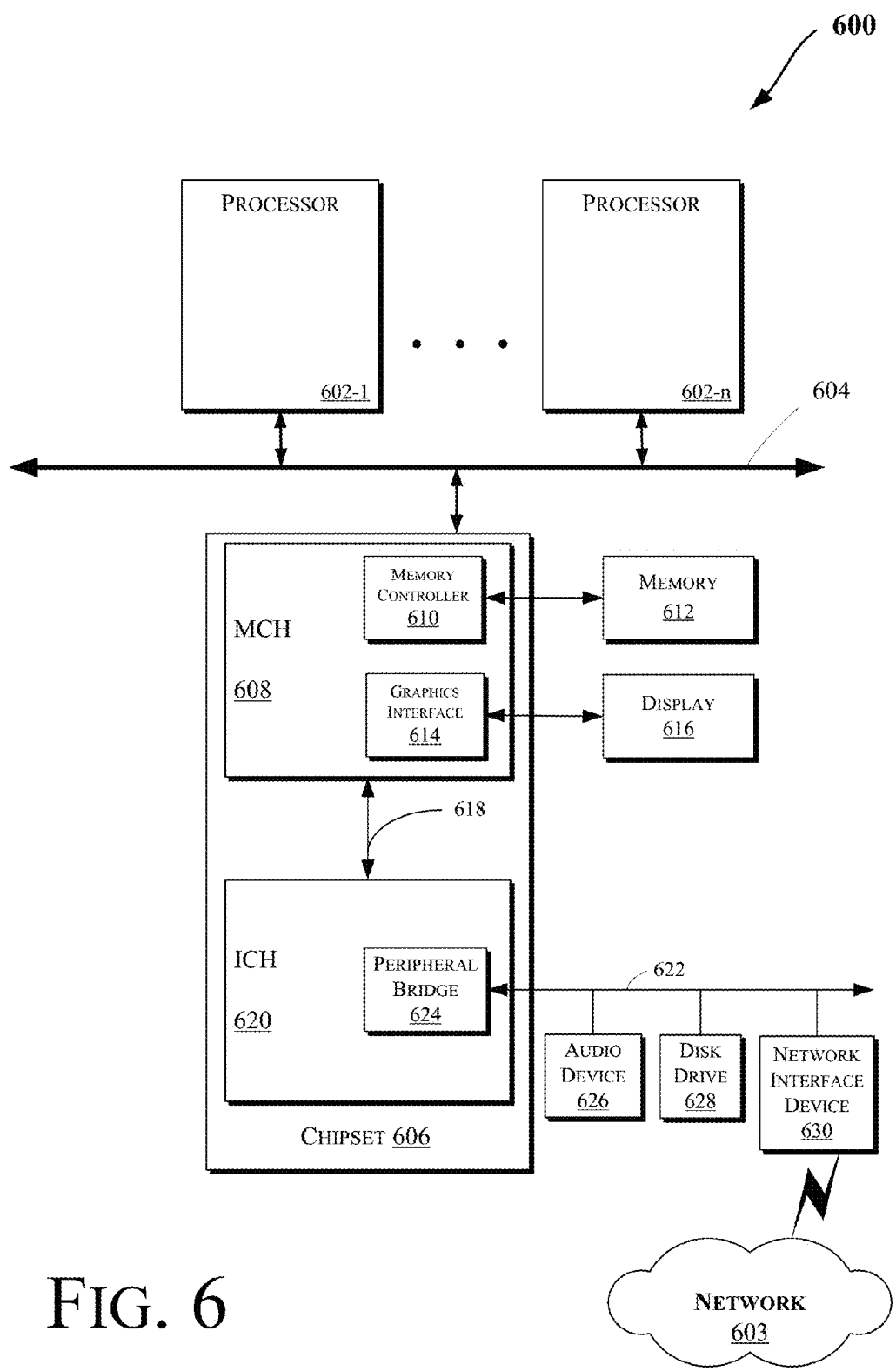
FIGS. 6-10 are schematic illustrations of electronic devices which may be adapted to implement a 360 degree hinge assembly in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
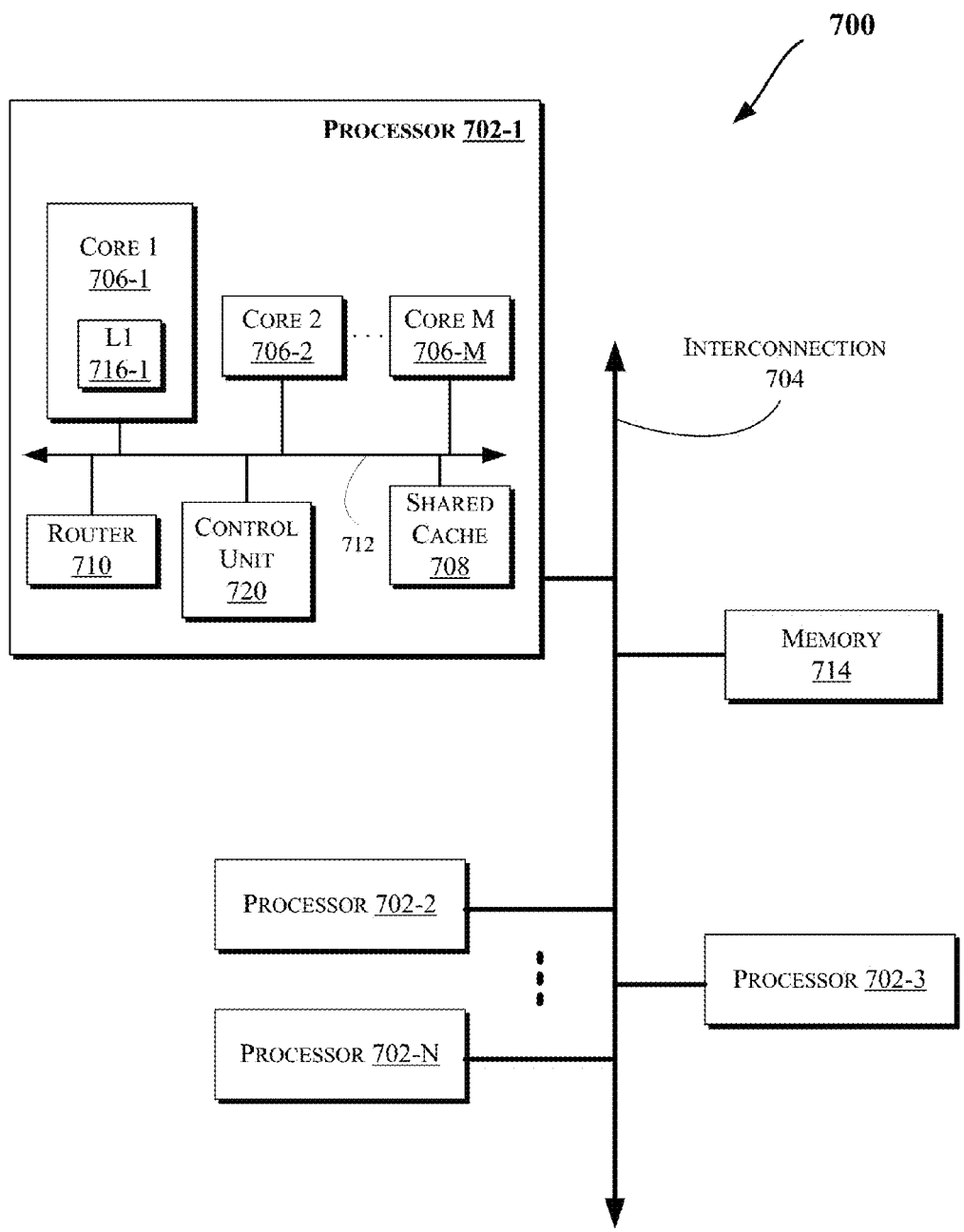

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
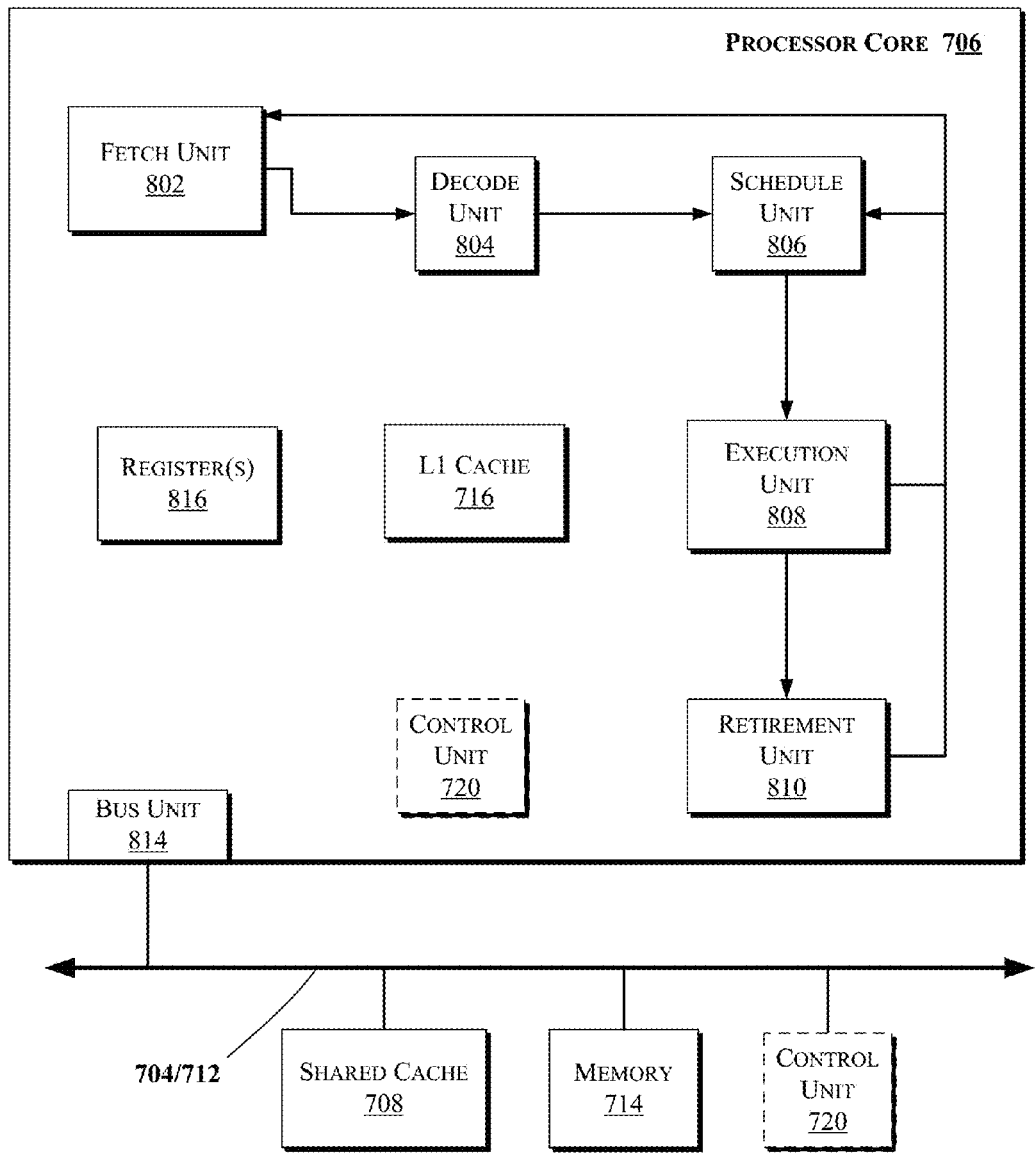

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
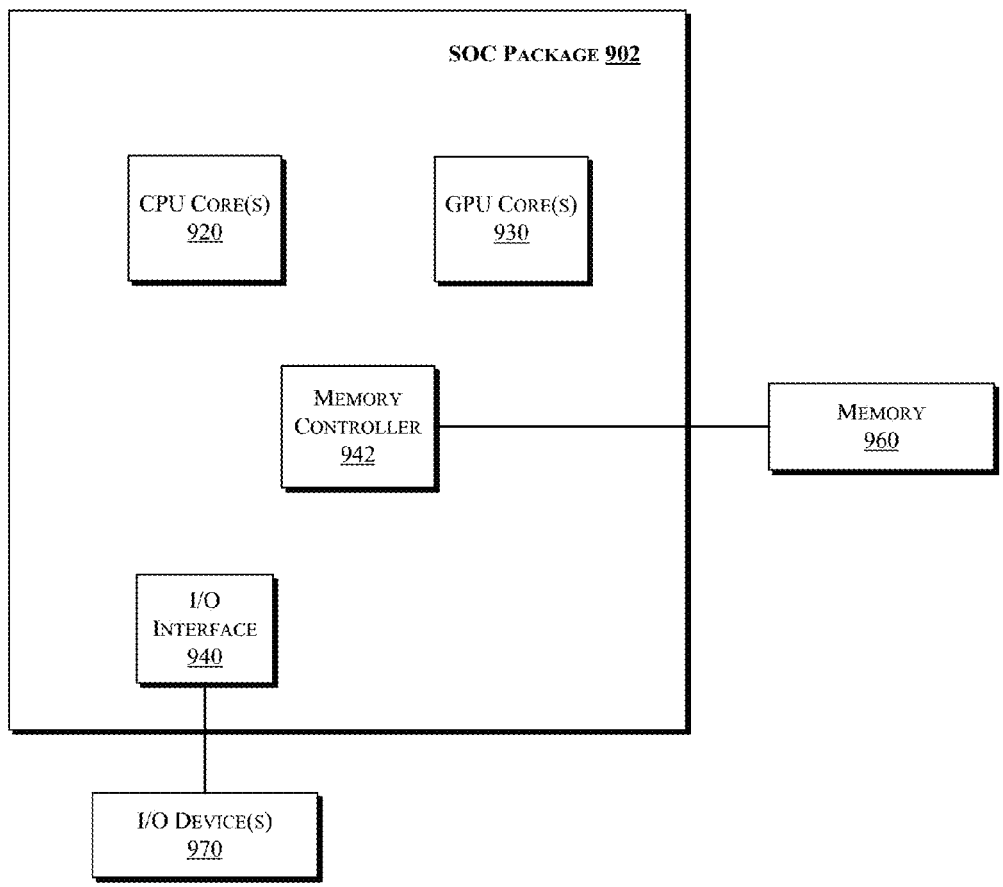

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
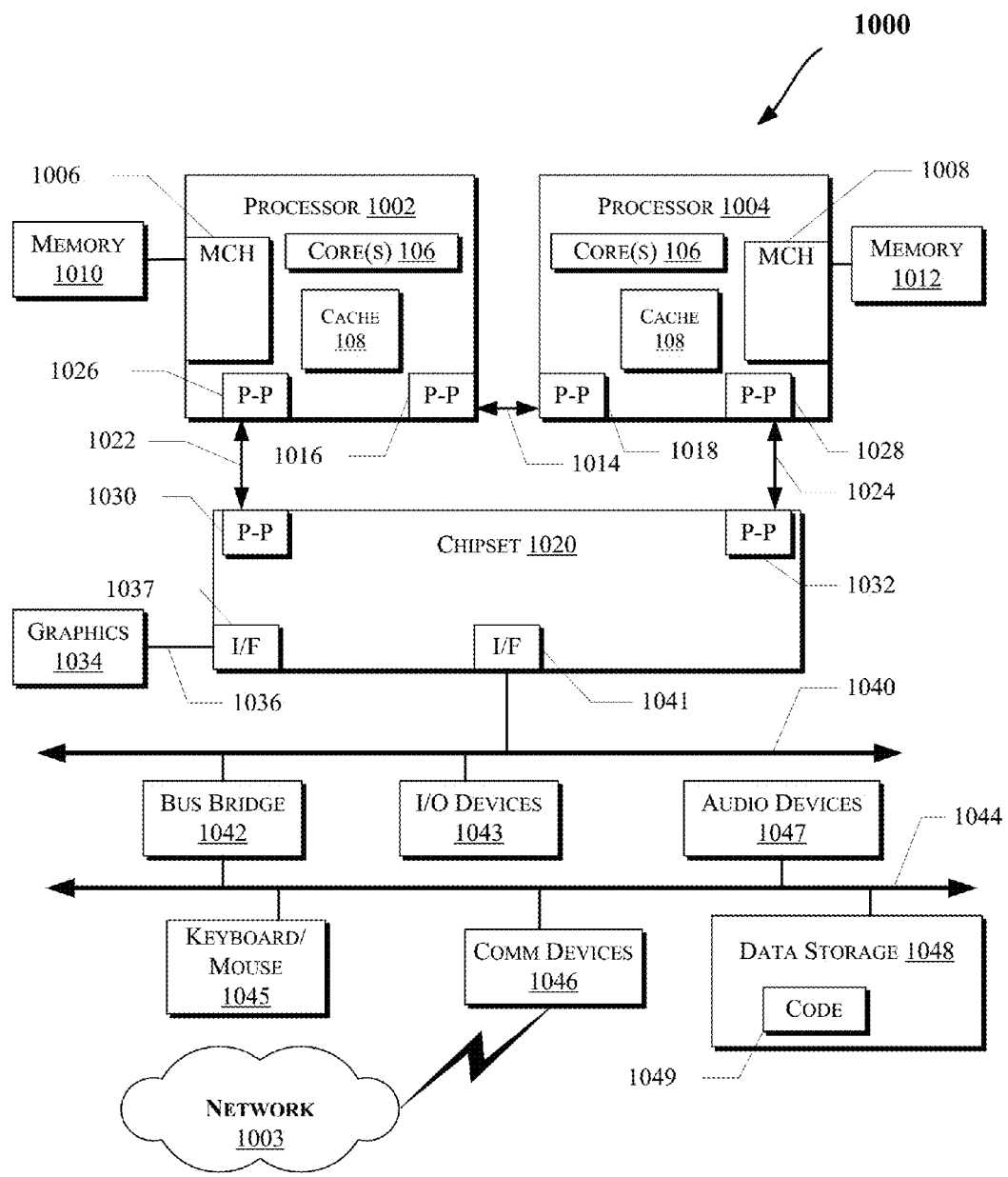

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is a hinge assembly for an electronic device, comprising a linkage comprising a first bushing disposed at a first end of the linkage and a second bushing disposed at a second end of the bushing, a first shaft rotatable within the first bushing about a first axis, a second shaft rotatable within the second bushing about a second axis, and at least one compression element disposed on the first shaft, wherein the first shaft and the first bushing are threaded such that rotation of the first shaft within the first bushing induces lateral translation of the first shaft along the first axis.

In Example 2, the subject matter of Example 1 can optionally include an arrangement in which a first tension screw to adjust a tension between the first shaft and the first bushing.

In Example 3, the subject matter of any one of Examples 1-2 can optionally include an arrangement in which the at least one compression element disposed on the first shaft comprises at least one of a compression spring or a spring washer.

In Example 4, the subject matter of any one of Examples 1-3 can optionally include an arrangement in which lateral translation of the first shaft within the first bushing changes a force applied to the at least one compression element disposed on the first shaft, thereby changing a rotational resistance of the hinge assembly.

In Example 5, the subject matter of any one of Examples 1-4 can optionally an arrangement in which a second tension screw to adjust a tension between the second shaft and the second bushing.

In Example 6, the subject matter of any one of Examples 1-5 can optionally include an arrangement in which the linkage further comprises at least one compression element disposed on the second shaft.

In Example 7, the subject matter of any one of Examples 1-6 can optionally include an arrangement in which the at least one compression element disposed on the second shaft comprises at least one of a compression spring or a spring washer.

In Example 8, the subject matter of any one of Examples 1-7 can optionally include an arrangement in which lateral translation of the second shaft within the second bushing changes a force applied to the at least one compression element disposed on the second shaft, thereby changing a rotational resistance of the hinge assembly.

Example 9 is a chassis for an electronic device, comprising a first section and a second section and a hinge assembly for an electronic device, comprising a linkage comprising a first bushing disposed at a first end of the linkage and a second bushing disposed at a second end of the bushing, a first shaft rotatable within the first bushing about a first axis, a second shaft rotatable within the second bushing about a second axis, and at least one compression element disposed on the first shaft, wherein the first shaft and the first bushing are threaded such that rotation of the first shaft within the first bushing induces lateral translation of the first shaft along the first axis.

In Example 10, the subject matter of Example 9 can optionally include an arrangement in which a first tension screw to adjust a tension between the first shaft and the first bushing.

In Example 11, the subject matter of any one of Examples 9-10 can optionally include an arrangement in which the at least one compression element disposed on the first shaft comprises at least one of a compression spring or a spring washer.

In Example 12, the subject matter of any one of Examples 9-11 can optionally include an arrangement in which lateral translation of the first shaft within the first bushing changes a force applied to the at least one compression element disposed on the first shaft, thereby changing a rotational resistance of the hinge assembly.

In Example 13, the subject matter of any one of Examples 9-12 can optionally an arrangement in which a second tension screw to adjust a tension between the second shaft and the second bushing.

In Example 14, the subject matter of any one of Examples 9-13 can optionally include an arrangement in which the linkage further comprises at least one compression element disposed on the second shaft.

In Example 15, the subject matter of any one of Examples 9-14 can optionally include an arrangement in which the at least one compression element disposed on the second shaft comprises at least one of a compression spring or a spring washer.

In Example 16, the subject matter of any one of Examples 9-15 can optionally include an arrangement in which lateral translation of the second shaft within the second bushing changes a force applied to the at least one compression element disposed on the second shaft, thereby changing a rotational resistance of the hinge assembly.

Example 17 is a an electronic device comprising a controller, a chassis comprising a first section and a second section, and a chassis for an electronic device, comprising a first section and a second section and a hinge assembly for an electronic device, comprising a linkage comprising a first bushing disposed at a first end of the linkage and a second bushing disposed at a second end of the bushing, a first shaft rotatable within the first bushing about a first axis, a second shaft rotatable within the second bushing about a second axis, and at least one compression element disposed on the first shaft, wherein the first shaft and the first bushing are threaded such that rotation of the first shaft within the first bushing induces lateral translation of the first shaft along the first axis.

In Example 18, the subject matter of Example 17 can optionally include an arrangement in which a first tension screw to adjust a tension between the first shaft and the first bushing.

In Example 19, the subject matter of any one of Examples 17-18 can optionally include an arrangement in which the at least one compression element disposed on the first shaft comprises at least one of a compression spring or a spring washer.

In Example 20, the subject matter of any one of Examples 17-19 can optionally include an arrangement in which lateral translation of the first shaft within the first bushing changes a force applied to the at least one compression element disposed on the first shaft, thereby changing a rotational resistance of the hinge assembly.

In Example 21, the subject matter of any one of Examples 17-20 can optionally an arrangement in which a second tension screw to adjust a tension between the second shaft and the second bushing.

In Example 22, the subject matter of any one of Examples 17-21 can optionally include an arrangement in which the linkage further comprises at least one compression element disposed on the second shaft.

In Example 23, the subject matter of any one of Examples 17-22 can optionally include an arrangement in which the at least one compression element disposed on the second shaft comprises at least one of a compression spring or a spring washer.

In Example 24, the subject matter of any one of Examples 17-23 can optionally include an arrangement in which lateral translation of the second shaft within the second bushing changes a force applied to the at least one compression element disposed on the second shaft, thereby changing a rotational resistance of the hinge assembly.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A hinge assembly for an electronic device, comprising:
    a linkage comprising a first bushing disposed at a first end of the linkage and a second bushing disposed at a second end of the bushing;
    a first shaft rotatable within the first bushing about a first axis extending longitudinally through the first shaft, the first shaft coupled to a first bracket;
    a second shaft rotatable within the second bushing about a second axis extending longitudinally through the second shaft, the second shaft coupled to a second bracket; and
    at least one compression element disposed on the first shaft and adjacent the first bracket,
    wherein the first shaft and the first bushing are threaded such that rotation of the first shaft within the first bushing induces lateral translation of the first shaft along the first axis to change a force applied to the at least one compression element disposed on the first shaft, thereby changing a rotational resistance of the hinge assembly.

2. The hinge assembly of claim 1, wherein the linkage further comprises:
    a first tension screw mounted on the linkage to adjust a tension between the first shaft and the first bushing.

3. The hinge assembly of claim 1, wherein the at least one compression element disposed on the first shaft comprises at least one of:
    a compression spring; or
    a spring washer.

4. The hinge assembly of claim 1, wherein the linkage further comprises:
    a second tension screw to adjust a tension between the second shaft and the second bushing.

5. The hinge assembly of claim 1, wherein the linkage further comprises:
    at least one compression element disposed on the second shaft and adjacent the second bracket.

6. The hinge assembly of claim 5, wherein the at least one compression element disposed on the second shaft comprises at least one of:
    a compression spring; or
    a spring washer.

7. The hinge assembly of claim 5, wherein:
    lateral translation of the second shaft within the second bushing changes a force applied to the at least one compression element disposed on the second shaft, thereby changing a rotational resistance of the hinge assembly.

8. A chassis for an electronic device, comprising:
    a first section and a second section; and
    a hinge assembly to connect the first section of the chassis to the second section of the chassis, comprising:

a linkage comprising a first bushing disposed at a first end of the linkage and a second bushing disposed at a second end of the bushing;
a first shaft rotatable within the first bushing about a first axis extending longitudinally through the first shaft, the first shaft coupled to a first bracket;
a second shaft rotatable within the second bushing about a second axis extending longitudinally through the second shaft, the second shaft coupled to a second bracket; and
at least one compression element disposed on the first shaft and adjacent the first bracket,
wherein the first shaft and the first bushing are threaded such that rotation of the first shaft within the first bushing induces lateral translation of the first shaft along the first axis to change a force applied to the at least one compression element disposed on the first shaft, thereby changing a rotational resistance of the hinge assembly.

9. The chassis of claim 8, wherein the linkage further comprises:
a first tension screw to adjust a tension between the first shaft and the first bushing.

10. The chassis of claim 8, wherein the at least one compression element disposed on the first shaft comprises at least one of:
a compression spring; or
a spring washer.

11. The chassis of claim 8, wherein the linkage further comprises:
a second tension screw mounted on the linkage to adjust a tension between the second shaft and the second bushing.

12. The chassis of claim 8, wherein the linkage further comprises:
at least one compression element disposed on the second shaft and adjacent the second bracket.

13. The chassis of claim 12, wherein the at least one compression element disposed on the second shaft comprises at least one of:
a compression spring; or
a spring washer.

14. The chassis of claim 12, wherein:
lateral translation of the second shaft within the second bushing changes a force applied to the at least one compression element disposed on the second shaft, thereby changing a rotational resistance of the hinge assembly.

15. An electronic device, comprising:
a controller;
a chassis comprising a first section and a second section; and
a hinge assembly to connect the first section of the chassis to the second section of the chassis, comprising:
a linkage comprising a first bushing disposed at a first end of the linkage and a second bushing disposed at a second end of the bushing;
a first shaft rotatable within the first bushing about a first axis extending longitudinally through the first shaft, the first shaft coupled to a first bracket;
a second shaft rotatable within the second bushing about a second axis extending longitudinally through the second shaft, the second shaft coupled to a second bracket; and
at least one compression element disposed on the first shaft and adjacent the first bracket,
wherein the first shaft and the first bushing are threaded such that rotation of the first shaft within the first bushing induces lateral translation of the first shaft along the first axis to change a force applied to the at least one compression element disposed on the first shaft, thereby changing a rotational resistance of the hinge assembly.

16. The electronic device of claim 15, wherein the linkage further comprises:
a first tension screw to adjust a tension between the first shaft and the first bushing.

17. The electronic device of claim 15, wherein the at least one compression element disposed on the first shaft comprises at least one of:
a compression spring; or
a spring washer.

18. The electronic device of claim 15, wherein the linkage further comprises:
a second tension screw mounted on the linkage to adjust a tension between the first shaft and the first bushing.

19. The electronic device of claim 15, wherein the linkage further comprises:
at least one compression element disposed on the second shaft and adjacent the second bracket.

20. The electronic device of claim 19, wherein the at least one compression element disposed on the second shaft comprises at least one of:
a compression spring; or
a spring washer.

21. The electronic device of claim 19, wherein:
lateral translation of the second shaft within the second bushing changes a force applied to the at least one compression element disposed on the second shaft, thereby changing a rotational resistance of the hinge assembly.

* * * * *